(12) United States Patent
Robertson, Jr. et al.

(10) Patent No.: US 12,179,675 B2
(45) Date of Patent: Dec. 31, 2024

(54) VEHICLE CLOSURE HAVING AUTOMATIC POSITION ADJUSTING SENSOR

(71) Applicant: FORD GLOBAL TECHNOLOGIES, LLC, Dearborn, MI (US)

(72) Inventors: Michael S. Robertson, Jr., West Bloomfield, MI (US); Tyler D. Hamilton, Farmington, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 18/111,706

(22) Filed: Feb. 20, 2023

(65) Prior Publication Data

US 2024/0278734 A1    Aug. 22, 2024

(51) Int. Cl.
*B60R 11/04* (2006.01)
*B60R 1/26* (2022.01)

(52) U.S. Cl.
CPC .............. *B60R 11/04* (2013.01); *B60R 1/26* (2022.01)

(58) Field of Classification Search
CPC ..... B60R 11/04; B60R 1/26; B60R 2011/004; B60R 2011/0085
See application file for complete search history.

(56) References Cited

U.S. PATENT DOCUMENTS

| 9,821,727 | B2 | 11/2017 | Weikert et al. | |
|---|---|---|---|---|
| 10,607,092 | B2 | 3/2020 | Murad et al. | |
| 2015/0183380 | A1* | 7/2015 | Da Deppo | B60R 11/04 348/148 |
| 2016/0176347 | A1* | 6/2016 | Kiehl | H04N 23/51 348/148 |
| 2017/0163939 | A1* | 6/2017 | Thompson | B60R 11/04 |
| 2022/0212603 | A1 | 7/2022 | Castro et al. | |
| 2022/0227296 | A1* | 7/2022 | Sperrle | G06T 3/4038 |
| 2022/0355735 | A1* | 11/2022 | Kroeze | B60W 60/0025 |
| 2023/0017327 | A1* | 1/2023 | Weston | B60W 40/12 |
| 2023/0097232 | A1* | 3/2023 | Tobie | H04N 23/51 348/148 |
| 2023/0097394 | A1* | 3/2023 | Nagao | B60R 11/04 348/148 |
| 2023/0241949 | A1* | 8/2023 | Fuentes | B60J 5/106 |
| 2024/0025343 | A1* | 1/2024 | Du | B60R 11/04 |
| 2024/0029318 | A1* | 1/2024 | Miao | B60R 1/00 |
| 2024/0286551 | A1* | 8/2024 | Nehls | B60R 11/04 |

* cited by examiner

*Primary Examiner* — Fernando Alcon
(74) *Attorney, Agent, or Firm* — Frank L. Lollo; MacMillan, Sobanski & Todd, LLC

(57) ABSTRACT

A closure on a vehicle with a sensor mounted to the closure that pivots relative to the closure as the closure is opened and closed to maintain a desired orientation of the sensor when the closure is in different positions.

14 Claims, 12 Drawing Sheets

VEHICLE CLOSURE HAVING AUTOMATIC POSITION ADJUSTING SENSOR

BACKGROUND OF THE INVENTION

The present invention relates to a sensor mounted on a vehicle, and more particularly to a sensor that automatically adjusts position based on a position of a vehicle closure.

Some vehicles come with sensors mounted to closures that can change position relative to the vehicle. For example, a rear view camera may be mounted on a tailgate of a pickup truck. For a fixed position rear view camera, the camera may only be useful when the tailgate is closed (i.e., in a fully upright position). If the pickup truck is operated when the tailgate is not closed, then the camera may be oriented in the wrong direction to be useful as a rear view camera. Pickup truck drivers, however, may operate the vehicle with the tailgate partially or fully open due to loading of long cargo items.

One proposed solution is a second rear view camera mounted to the tailgate that is oriented perpendicular to the first rear view camera. However, this may add more complexity than is desired. Another proposed solution involves employing a motor and gears with an electronic system that detects tailgate position and actuates the motor to change the orientation of the rear view camera relative to the tailgate. However, this may also add more complexity than is desired.

SUMMARY OF THE INVENTION

An embodiment contemplates a closure operatively engaging a vehicle, including an opening in a panel of the closure; a hinge about which the closure pivots; a sensor adjustment system comprising: a stationary bracket affixed to the closure adjacent to the opening; a hinged bracket pivotably mounted to the stationary bracket to be pivotable about a sensor pivot axis; a sensor mounted to the hinged bracket so as to pivot with the hinged bracket about the sensor pivot axis, the hinged bracket configured to orient the sensor to align the sensor with the opening; and a cable configured to have a first end engaging the hinge and a second opposed end engaging the hinged bracket such that a pivoting of the closure about the hinge relative to the vehicle causes the sensor to pivot about the sensor pivot axis.

An embodiment contemplates a closure operatively engaging a vehicle. The closure includes an opening in a panel of the closure; a hinge about which the closure pivots; and a sensor adjustment system comprising: a stationary bracket affixed to the closure adjacent to the opening; a weighted hinged bracket pivotably mounted to the stationary bracket to be pivotable about a sensor pivot axis and configured to orient the weighted hinged bracket based on an orientation relative to a direction of gravity; a sensor mounted to the hinged bracket so as to pivot with the hinged bracket about the sensor pivot axis, the hinged bracket configured to orient the sensor to align the sensor with the opening; and a locking mechanism configured to selectively prevent the rotation of the weighted hinged bracket relative to the stationary bracket.

An advantage of an embodiment is adjustment of a position of a sensor mounted on a closure, based on closure orientation relative to the vehicle, employing relatively simple and generally mechanical mechanisms to adjust the position. An example of such a sensor mounted on an enclosure is a rear view camera mounted on a tailgate of a pickup truck. Such a closure may include a liftgate or other closure movable relative to the vehicle body.

An advantage of an embodiment is use of a cable that causes automatic pivoting of the sensor based on a position of the closure relative to the vehicle body.

An advantage of an embodiment is a trim piece that automatically pivots with the sensor to improve esthetics and reduces chances that debris will enter 7 the closure.

An advantage of an embodiment is a weighted bracket attached to a pivotable sensor that automatically causes the sensor to pivot based on the position of the closure. An advantage of an embodiment may include a locking mechanism to selectively lock the pivotable sensor in order to reduce shaking of the sensor when in use.

DETAILED DESCRIPTION

Figure 1:
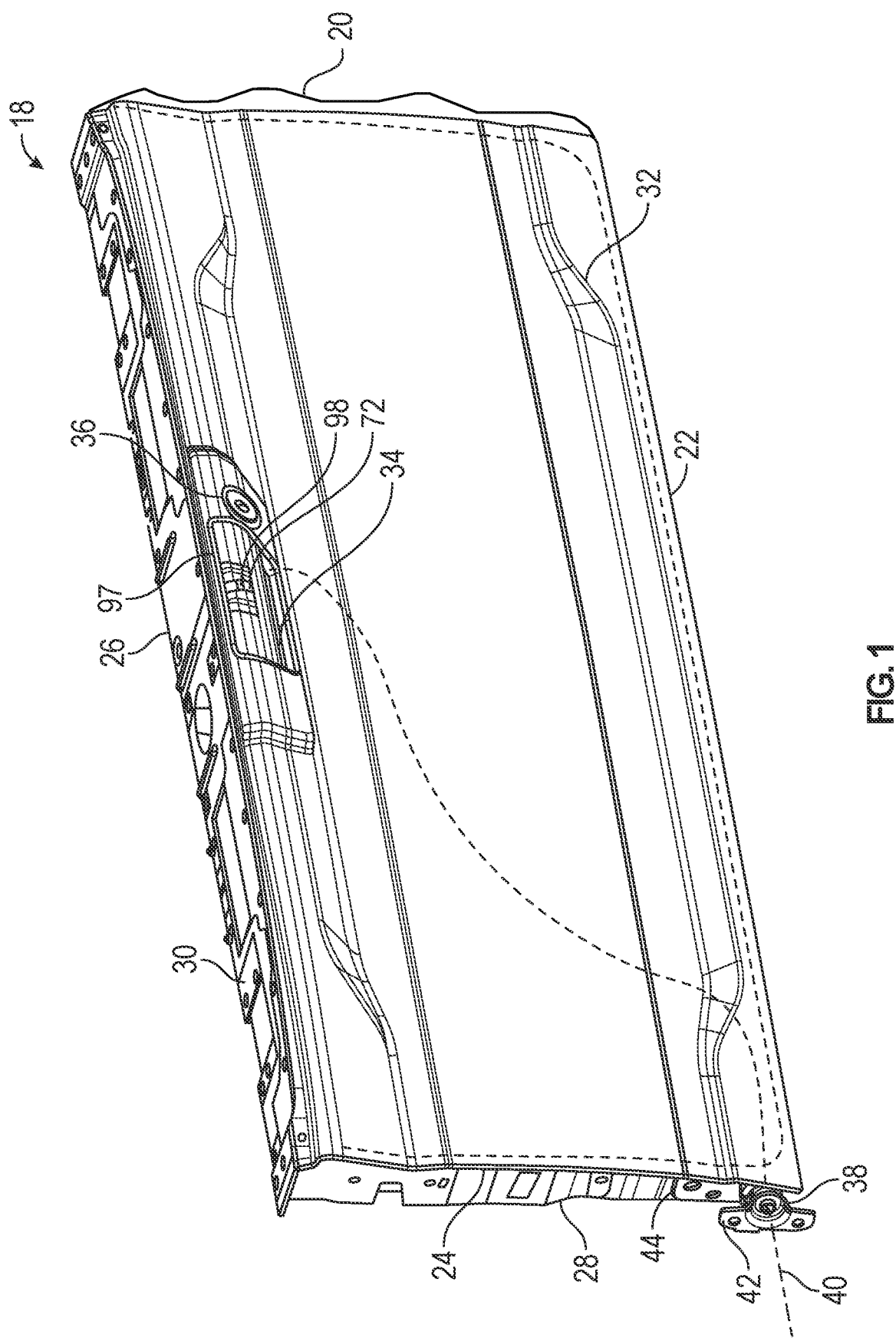
FIG. 1 is a schematic perspective view of a portion of a tailgate.
Figure 2:
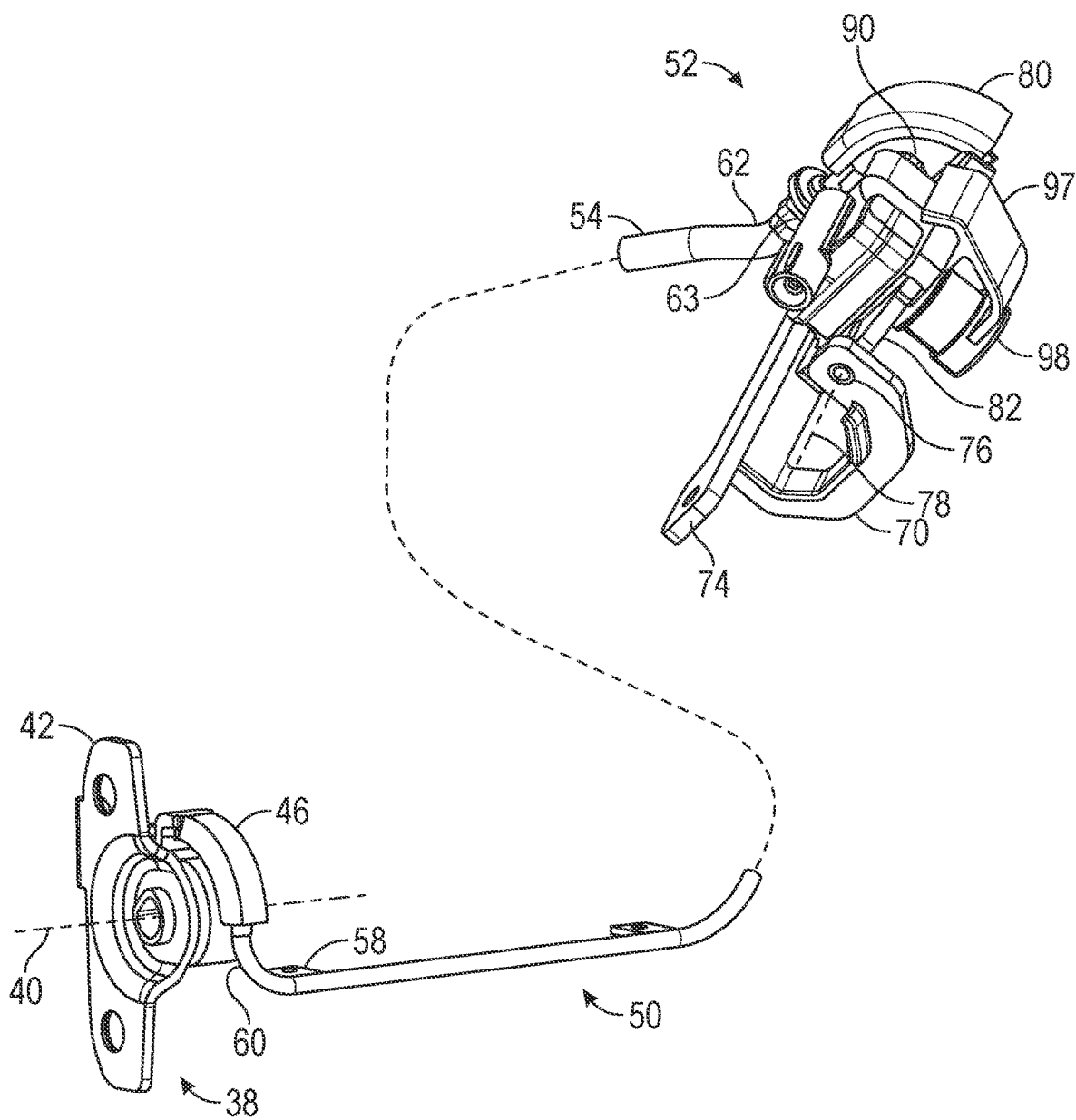
FIG. 2 is a schematic perspective view of a portion of a sensor adjustment system.
Figure 3:
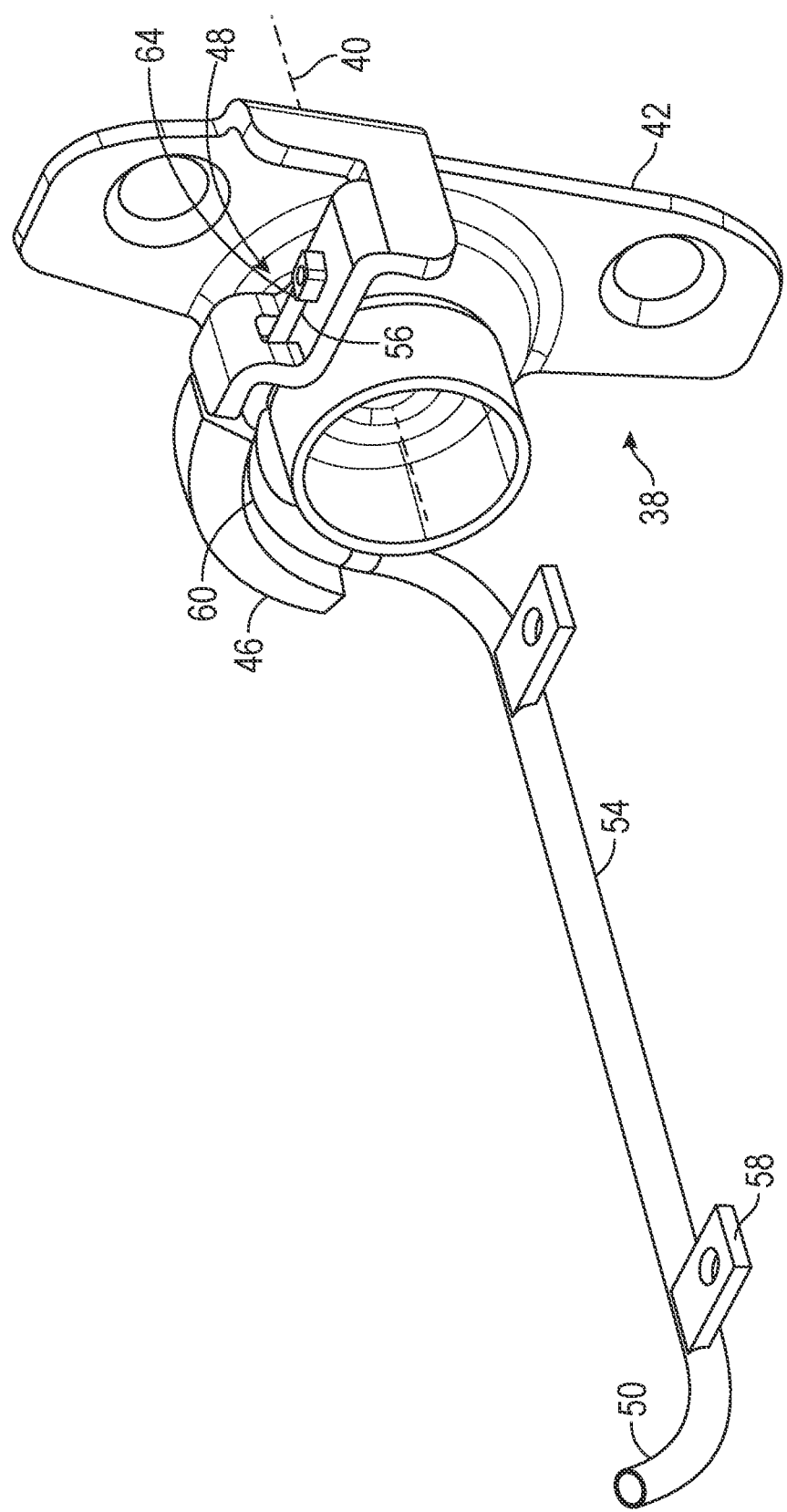
FIG. 3 is a schematic perspective view of a portion of a sensor adjustment system.
Figure 4:
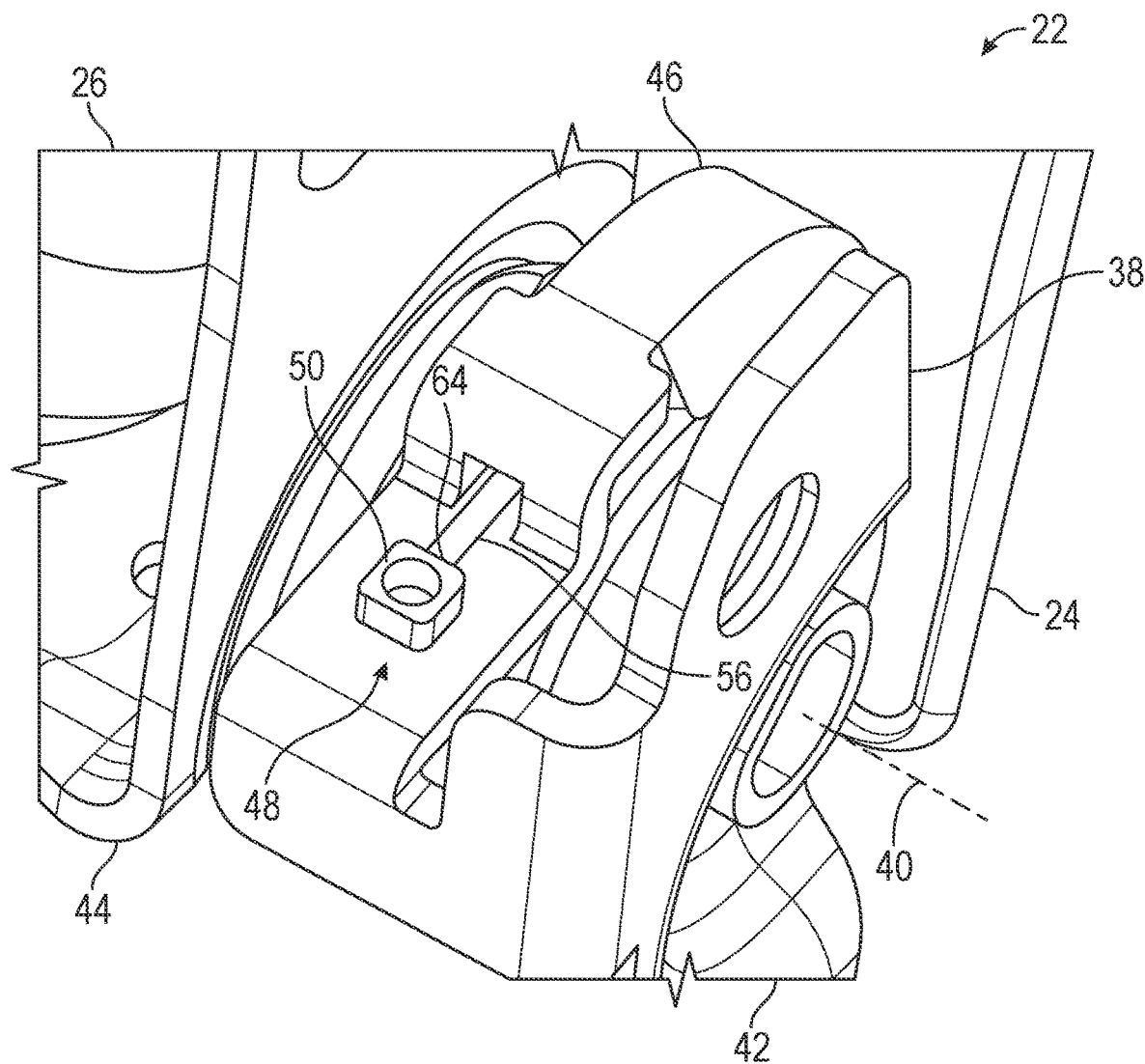
FIG. 4 is a schematic perspective view of a portion of a sensor adjustment system mounted on a closure.
Figure 5:
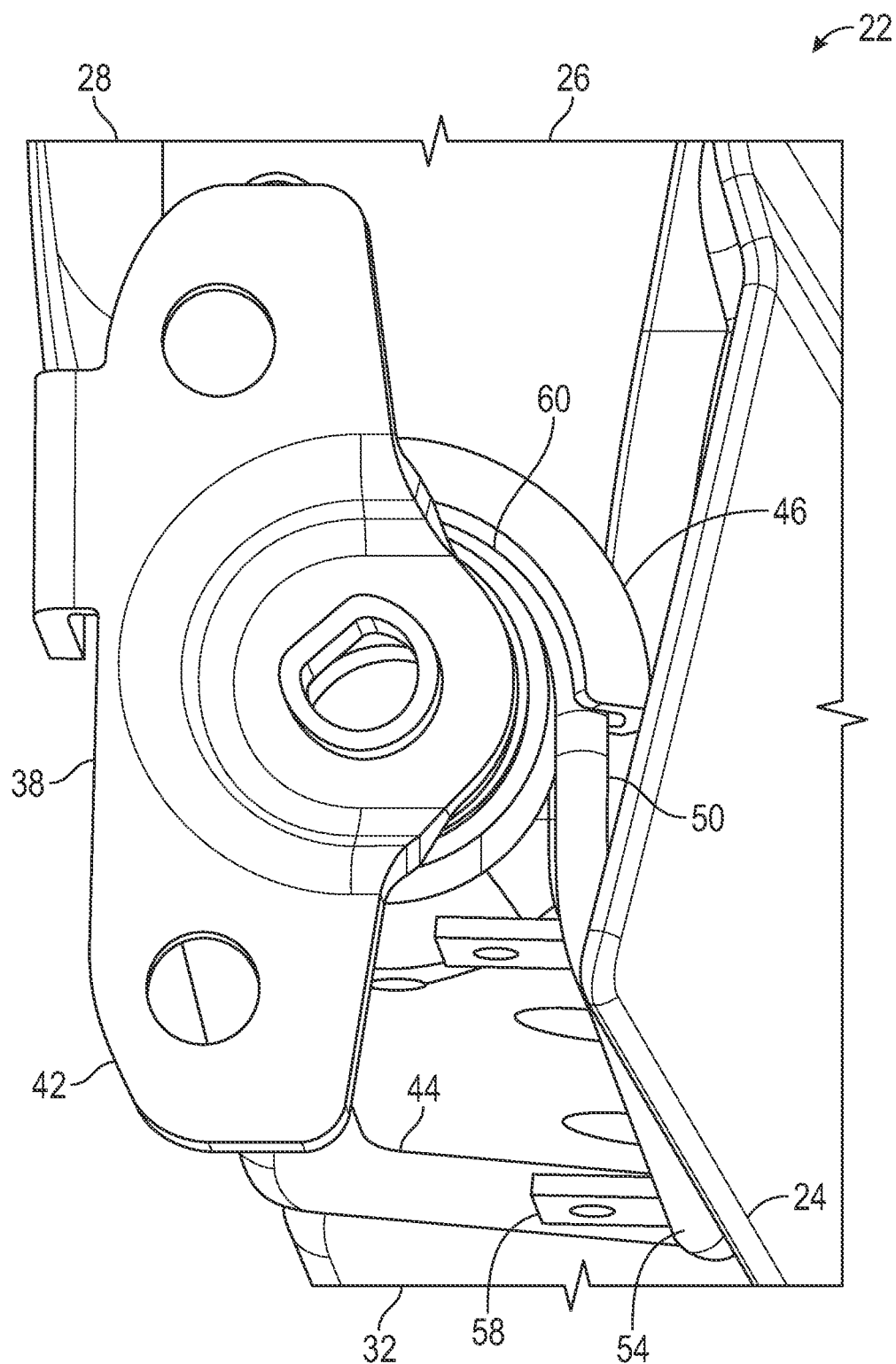
FIG. 5 is a schematic perspective view of a portion of a sensor adjustment system mounted on a closure.
Figure 6:
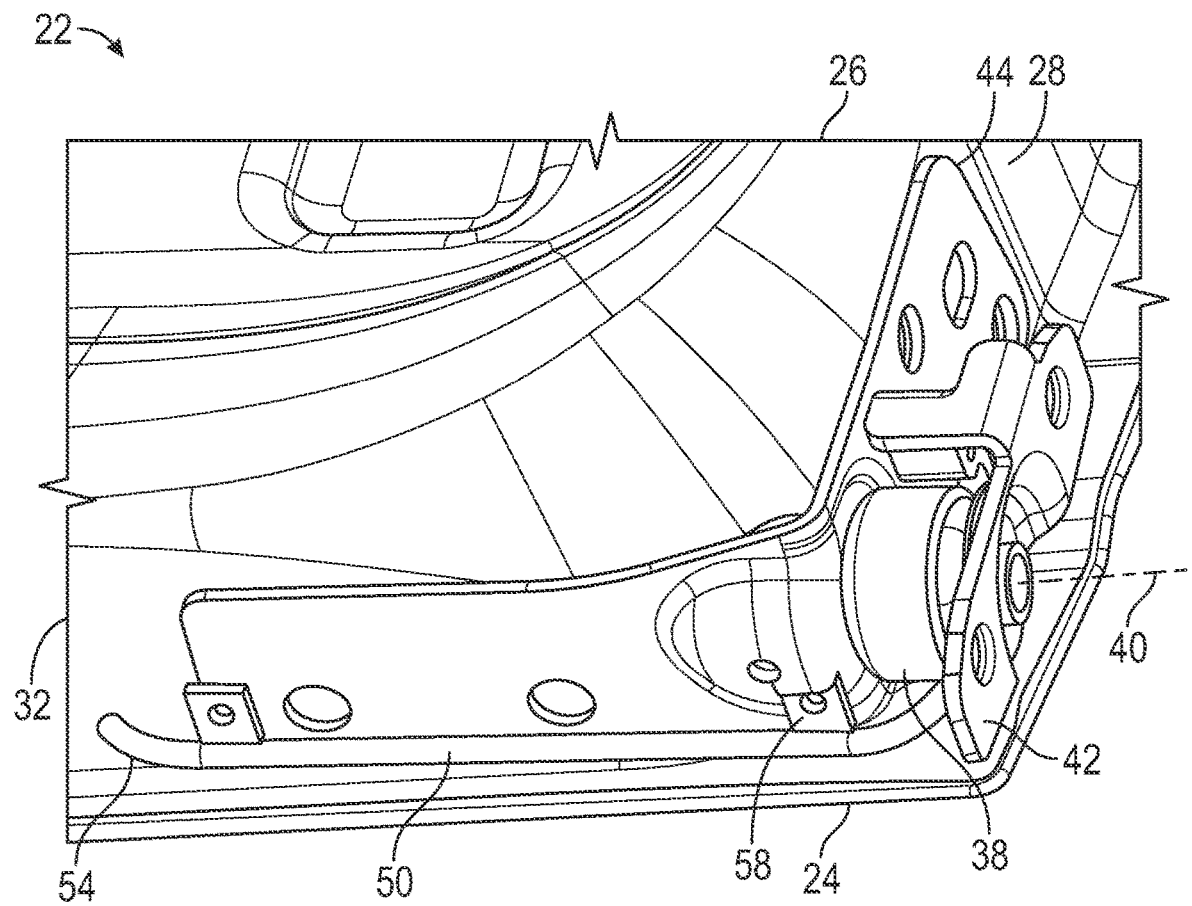
FIG. 6 is a schematic perspective view of a portion of a sensor adjustment system mounted on a closure.
Figure 7:
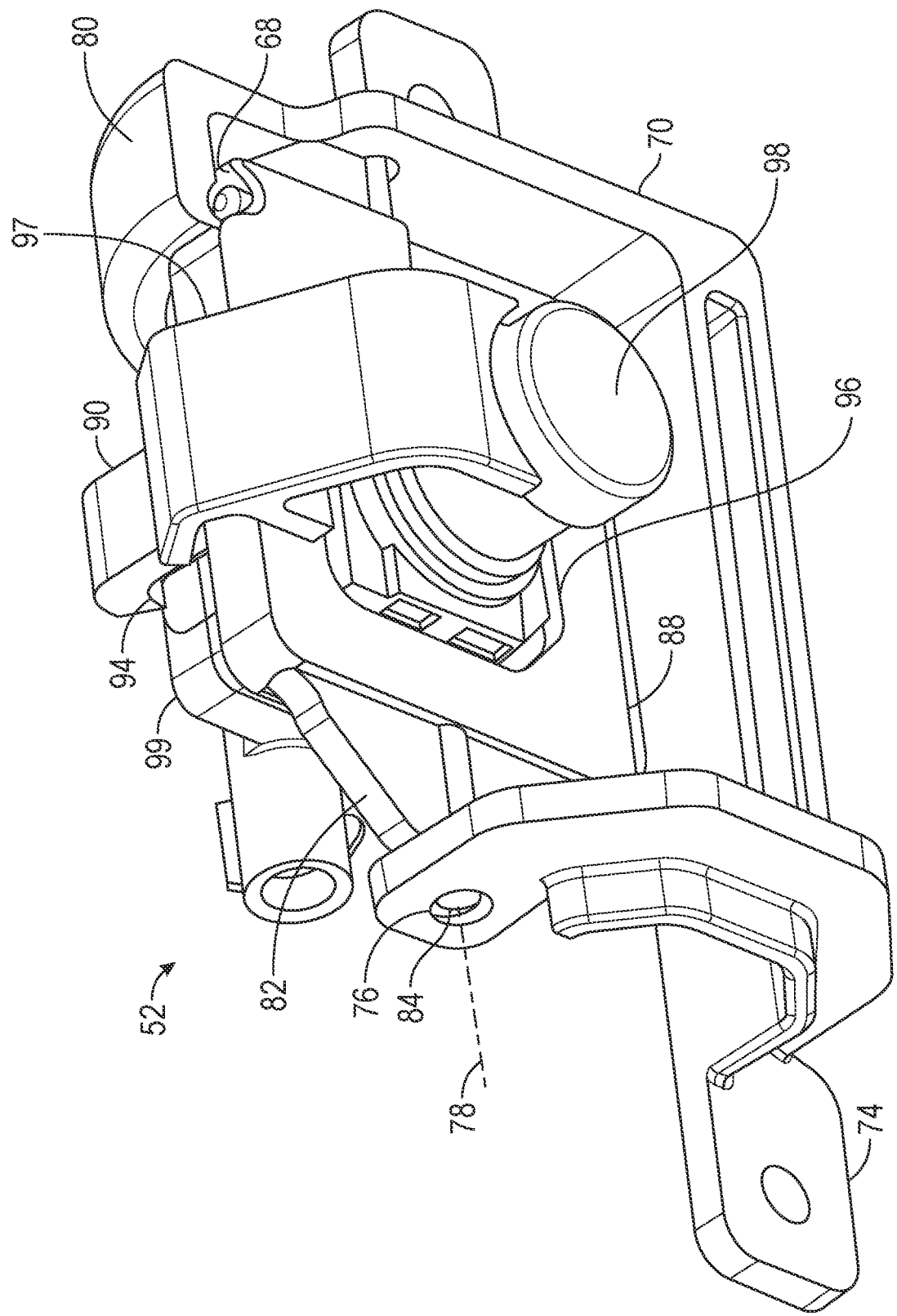
FIG. 7 is a schematic perspective view of a portion of a sensor adjustment system.
Figure 8:
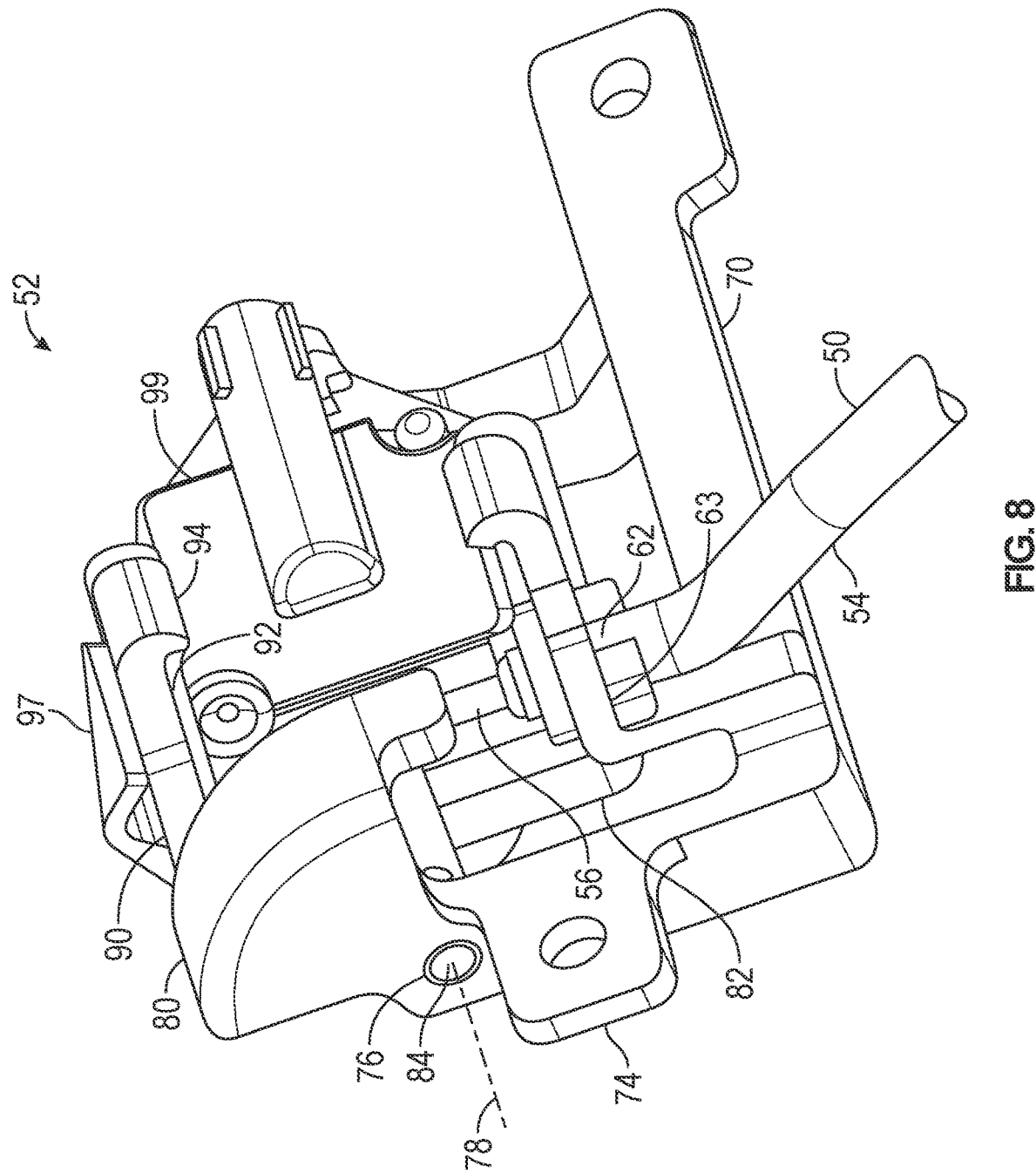
FIG. 8 is a schematic perspective view of a portion of a sensor adjustment system.
Figure 9:
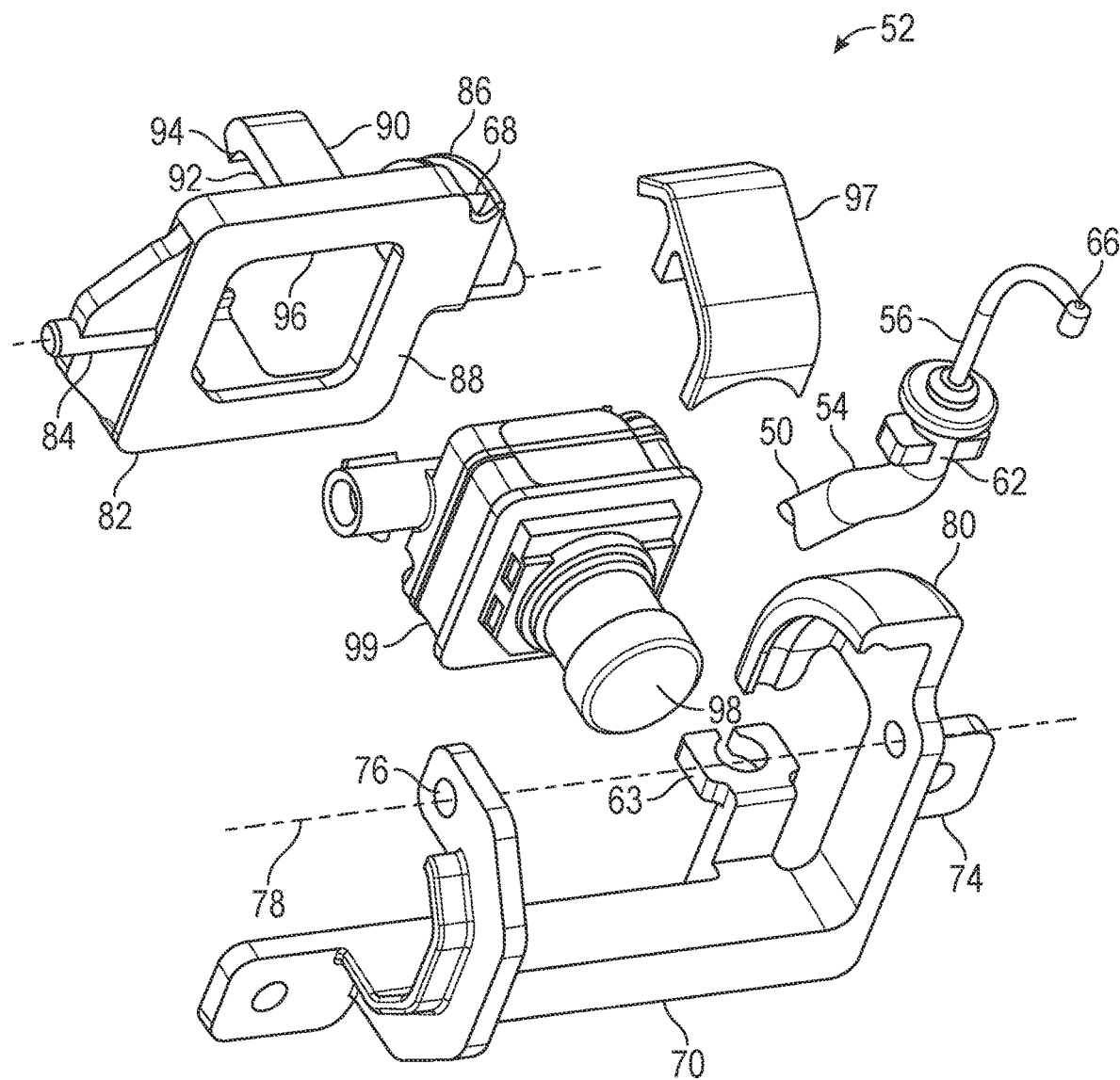
FIG. 9 is a schematic perspective view of a portion of a sensor adjustment system.
Figure 10:
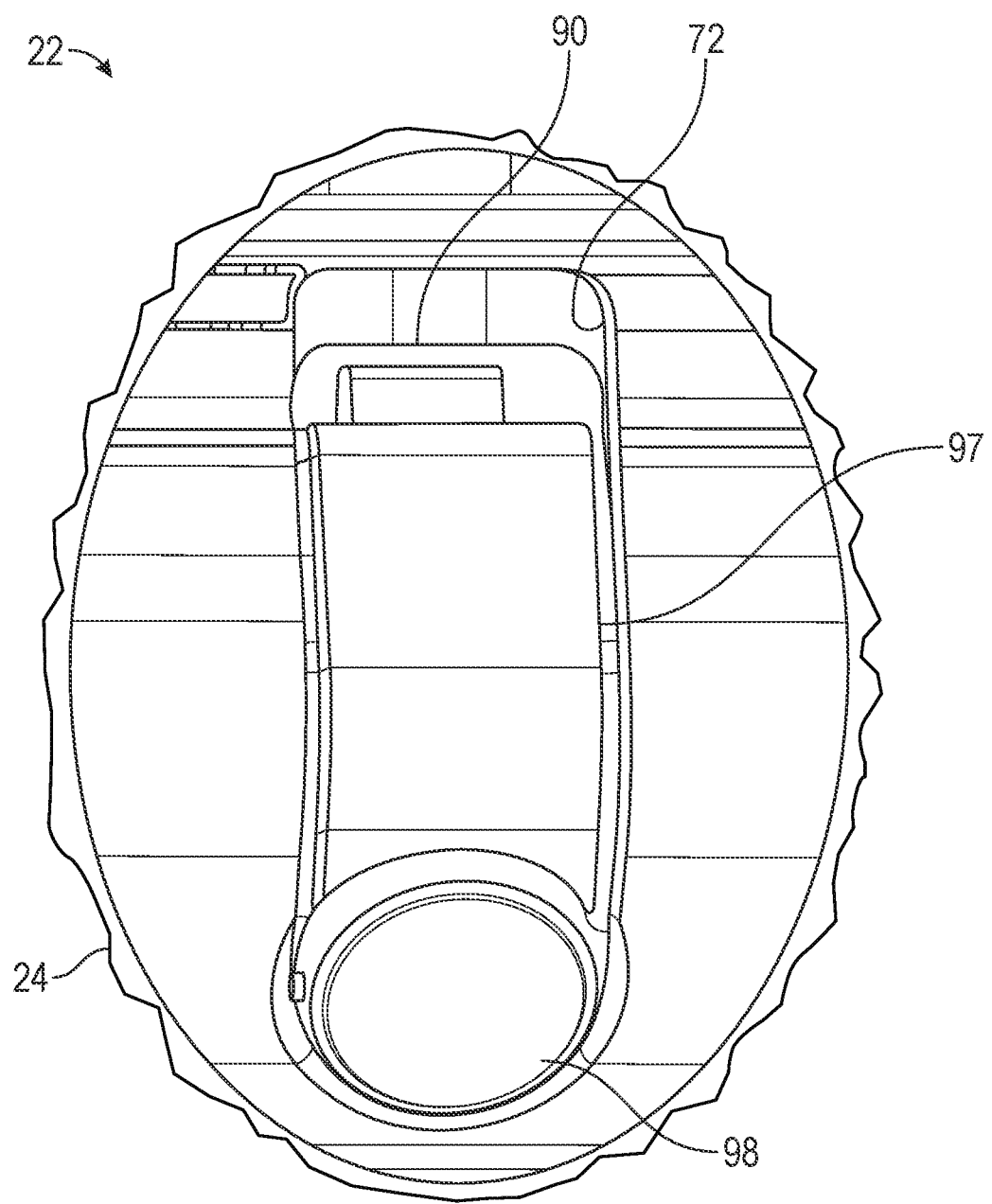
FIG. 10 is a schematic perspective view of a portion of a sensor adjustment system mounted on a closure.

FIGS. 1-10 illustrate an example of a vehicle closure (e.g., a tailgate) 22 that is pivotally mounted to vehicle structure 20 of a vehicle 18 (e.g., a pickup truck). The closure 22 includes an outer panel 24 mounted to closure structure 26, which has a pair of sides 28, a top 30 and a bottom 32. The closure 22 may have a handle/latch assembly 34 that can be operated by a hand to release the closure 22 from a closed position, and a key lock 36 for selectively preventing opening of the closure 22.

The example of a closure 22 illustrated in FIGS. 1-10 includes a pair of hinge assemblies 38, creating an axis 40 about which the closure 22 pivots relative to the vehicle structure 20. Each hinge assembly 38 includes a bodyside bracket 42 that is mounted and rotationally fixed to the vehicle structure 20, and a closure-side bracket 44 that is mounted and rotationally fixed to the closure 22. Such a closure-side bracket 44 may be secured to the side 28 and bottom 32 of the closure 22. The bodyside bracket 42 includes a cable guide 46 and a cable-end retainer 48, which are also rotationally fixed relative to the vehicle structure 20.

In the example of FIGS. 1-10, a cable assembly (e.g., a Bowden cable) 50 extends between one of the hinge assemblies 38 and a sensor adjustment system 52. The cable assembly 50 is a push-pull type of cable system. The cable assembly 50 includes a hollow outer cable housing 54, within which is mounted an inner cable 56. The cable housing 54 includes cable attachment brackets 58, which secure the cable housing 54 to the closure 22. A first end 60 of the cable housing 54 is guided into proper alignment with the bodyside bracket 42 by the cable guide 46, and a second end 62 of the cable housing 54 is secured to a cable housing retainer 63 of the sensor adjustment system 52. A first end 64 of the inner cable 56 is secured to the bodyside bracket 42 by the cable-end retainer 48, which may be a retention hole that prevents the first end 64 from moving away from the bodyside bracket 42 or a fastener, adhesive or welding that fixes the first end 64 relative to the bodyside bracket 42. A second end 66 of the inner cable 56 is affixed to a cable retainer 68 on the sensor adjustment system 52.

In the example illustrated in FIGS. 1-10, the sensor adjustment system 52 includes a stationary bracket 70 that is mounted to the closure structure 26 so as to fix the stationary bracket 70 relative to the closure structure 26 adjacent to a sensor opening 72. The stationary bracket 70 includes a pair of mounting flanges 74 that mount to the closure structure 26, the cable housing retainer 63 that secures the second end 62 of the cable housing 54, a pair of pivot holes 76 aligned along a sensor pivot axis 78, and an outer cable guide 80 that guides the second end 66 of the inner cable 56 to the cable retainer 68.

The illustrated example of the sensor adjustment system 52 in FIGS. 1-10 also includes a sensor hinged bracket 82, which includes a pair of axially aligned pivot pins 84, the cable retainer 68, an inner cable guide 86, a securing frame 88, and a sensor retaining mechanism 90, which may include a flexible retaining arm 92 extending from the securing frame 88 and a retaining hook 94 spaced from the securing frame 88. The pivot pins 84 align and engage with respective pivot holes 76, allowing the sensor hinged bracket 82 to pivot relative to the stationary bracket 70 about the sensor pivot axis 78. The inner cable guide 86 guides the inner cable 56, adjacent to the second end 66, to the cable retainer 68, with the inner cable guide 86 allowing the inner cable 56 to slide smoothly in and out of the second end 62 of the cable housing 54. The securing frame 88 includes an opening 96 through which a sensor 98 may extend, while retaining a main body 99 of the sensor 98 against the securing frame 88. The flexible retaining arm 92 and retailing hook 94 releasably holed the main body 99 against the securing frame 88. The sensor main body 99 and the sensor hinged bracket 82 may be integrated into a single component, if so desired. The sensor 98 may be, for example, a camera, which may be, for example, a rear view camera mounted on a rear closure of the vehicle 18, such as a tailgate. A trim piece 97 may mount to and pivot with the sensor hinged bracket 82. The trim piece 97 is sized and oriented to cover a portion of the sensor opening 72 based on a position of the sensor 98.

An example of the operation of the sensor adjustment system 52 relative to the closure 22 will now be discussed with reference to the example illustrated in FIGS. 1-10. The length of the inner cable 56 is such that, when connected between the hinge assembly 38 and the sensor adjustment system 52, and the closure 22 is in its closed position, the sensor 98 is held in a generally horizontal position (other desired positions may be employed for different types of sensors pivotally mounted to a particular vehicle closure). When the handle/latch assembly 34 is actuated and the closure begins to move from its closed position, the inner cable 56 pulls on the sensor hinged bracket 82 to cause the sensor hinged bracket 82 and hence the sensor 98 to pivot as the closure 22 is pivoted relative to the vehicle 18. The inner cable 56 causes pivoting of the sensor 98 as the closure 22 is opened to cause the sensor 98 to be oriented in essentially the same direction (e.g., horizontal) no matter what position the closure is in. Thus, for example, if the sensor 98 is a rear view camera mounted on a tailgate, then the rear view camera will be facing generally horizontally in a rearward direction no matter what position the tailgate is in.

FIGS. 1 and 11-15 illustrate an example of an embodiment of the closure 22 and vehicle structure 20 of a vehicle 18 having a sensor adjustment system 152 that is pivotable relative to the sensor opening 72. The closure may be, for example, a tailgate of a pickup truck. The sensor adjustment system 152 includes a support bracket 101 to which the sensor 98 is pivotally mounted about a pivot attachment 103, which defines the sensor pivot axis about which the sensor 98 pivots. The main body 99 of the sensor 98 includes a weighted bracket 105, which employs gravity to cause the sensor 98 to be directed in a generally horizontal direction regardless of the position of the closure 22. The sensor adjustment system 152 includes a locking mechanism 107 that is configured to reduce pivoting and vibration of the sensor 98 while the vehicle 18 is moving.

Figure 11:
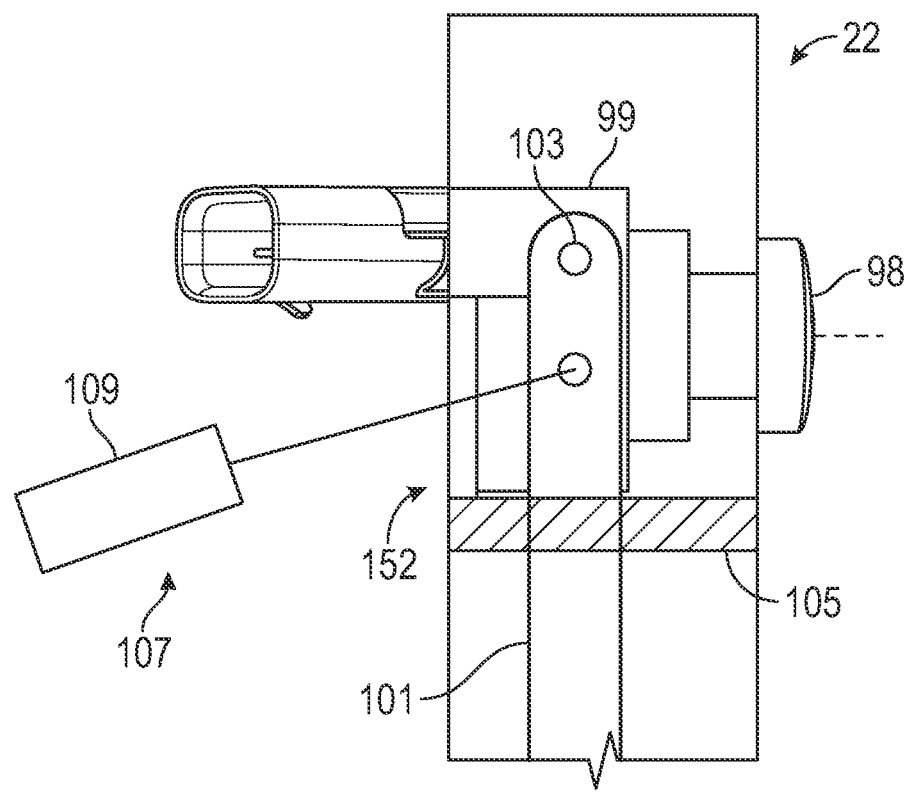
FIG. 11 is a schematic perspective view of a portion of a sensor adjustment system mounted on a closure in a closed position, according to another embodiment.
Figure 12:
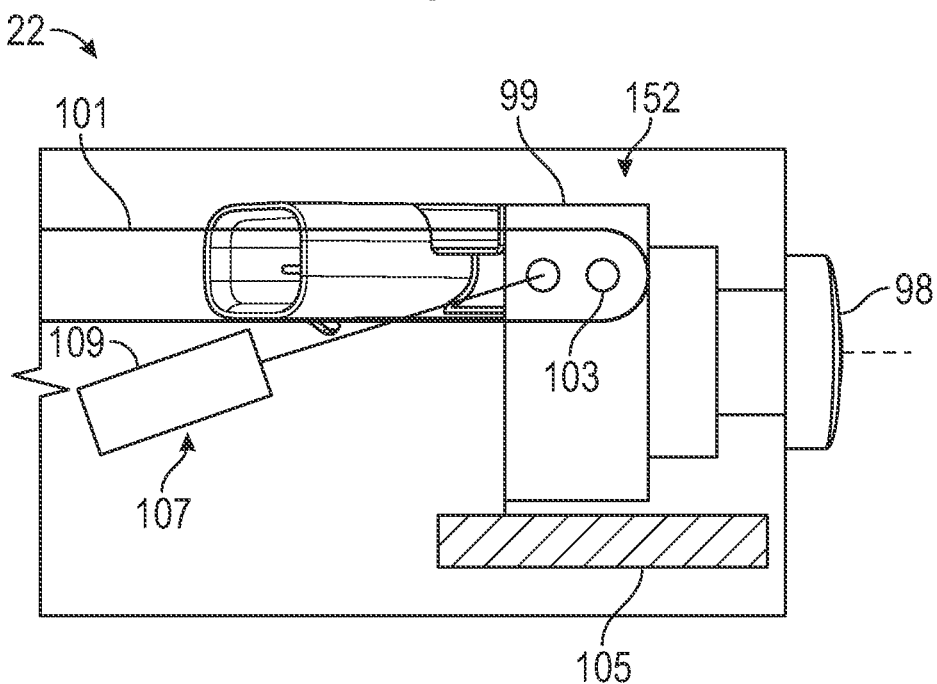
FIG. 12 is a schematic perspective view of a portion of a sensor adjustment system mounted on a closure in an open position, according to the embodiment of FIG. 11.

The example of the locking mechanism 107 is illustrated in FIGS. 11 and 12 as an electronically controlled solenoid valve 109 that selectively engages the main body 99 to limit the pivoting of the main body 99 relative to the support bracket 101. In one example, the solenoid valve 109 may be triggered when the handle/latch assembly 34 is actuated to release the closure 22—in which case the solenoid valve 109 engages the main body 99 when in the position shown in FIG. 11 and is released from the main body 99 when in the position illustrated in FIG. 12. Other procedures for when the solenoid valve 109 is engaged or release may be employed instead. The solenoid valve may be powered by the vehicle electrical system and controlled by a vehicle controller, which are known to those skilled in the art.

Figure 13:
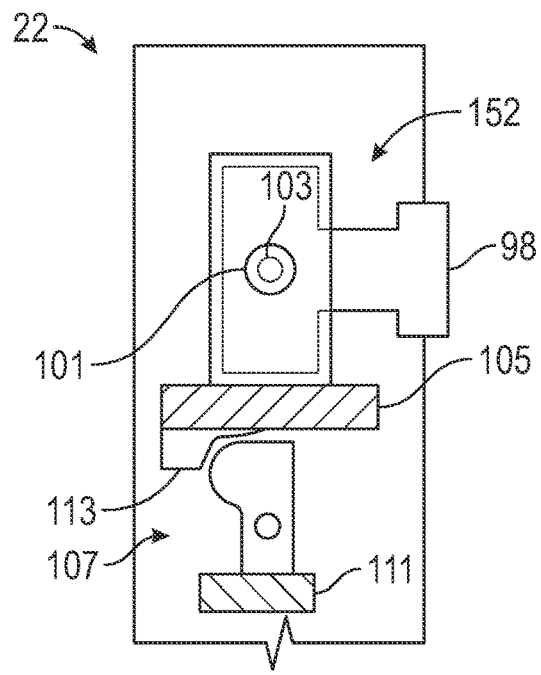
FIG. 13 is a schematic perspective view of a portion of a sensor adjustment system mounted on a closure in a closed position, according to another embodiment.
Figure 14:
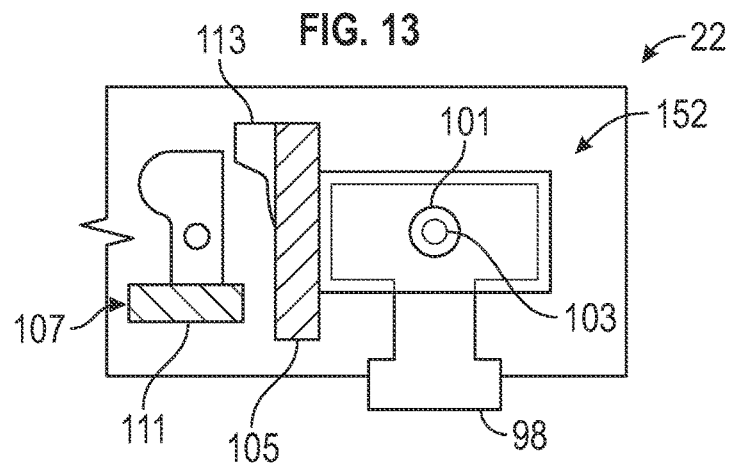
FIG. 14 is a schematic perspective view of a portion of a sensor adjustment system mounted on a closure in an open position, according to the embodiment of FIG. 13.
Figure 15:
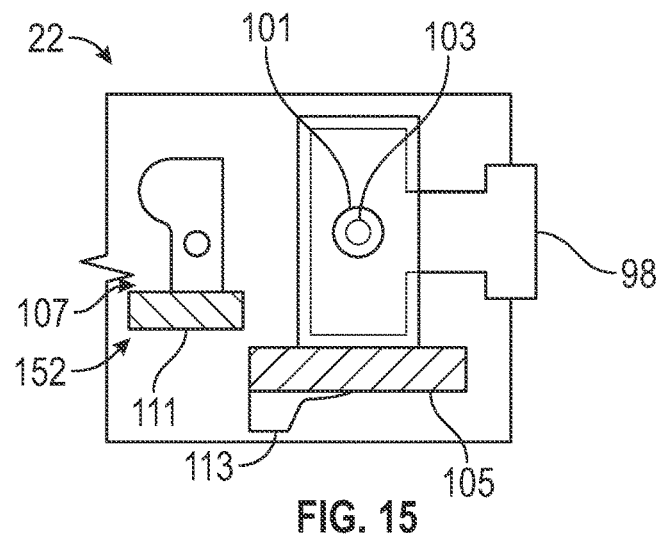
FIG. 15 is a schematic perspective view of a portion of a sensor adjustment system mounted on a closure in an open position, according to the embodiment of FIG. 13.

The example of the locking mechanism 107 is illustrated in FIGS. 13-15 as a mechanical pivot limiter having a weighted swing lever 111 that is pivotable about a parallel axis to the sensor pivot axis, and with the weighted bracket 105 including a gimble extension 113 that selectively engages the weighted swing lever 111. In FIG. 13, the closure 22 is illustrated in an upright, closed position. In such a position, gravity causes the sensor 98 to be facing in a generally horizontal direction and the swing lever 111 to engage the gimble extension 113, thus assuring that the sensor 98 is held in a sable position relative to the closure 22 even as the vehicle 18 drives on level surfaces and inclines. In FIG. 14, the closure 22 is illustrated just as it reaches a generally horizontal, open position, with gravity causing the swing lever 111 to pivot ninety degrees relative to the closure 22, thus releasing the gimble extension 113. At that point, the sensor 98 is free to swing, due to gravity, so that the sensor 98 is again generally facing in a horizontal direction, as illustrated in FIG. 15. The sensor 98 remains in this position until the closure 22 is again closed, at which point the sensor 98 pivots to the position shown in FIG. 13.

While certain embodiments of the present invention have been described in detail, those familiar with the art to which this invention relates will recognize various alternative designs and embodiments for practicing the invention as defined by the following claims.

The invention claimed is:

1. A closure operatively engaging a vehicle, the closure comprising:
   an opening in a panel of the closure;
   a hinge about which the closure pivots; and
   a sensor adjustment system comprising:
      a stationary bracket affixed to the closure adjacent to the opening;
      a hinged bracket pivotably mounted to the stationary bracket to be pivotable about a sensor pivot axis;
      a sensor mounted to the hinged bracket so as to pivot with the hinged bracket about the sensor pivot axis, the hinged bracket configured to orient the sensor to align the sensor with the opening; and
      a cable configured to have a first end engaging the hinge and a second opposed end engaging the hinged bracket such that a pivoting of the closure about the hinge relative to the vehicle causes the sensor to pivot about the sensor pivot axis.

2. The closure of claim 1 wherein the hinge about which the closure pivots and the sensor pivot axis are parallel.

3. The closure of claim 1 wherein the closure is a tailgate and the sensor is a rear view camera.

4. The closure of claim 1 wherein the cable is a Bowden cable that includes a cable housing secured to the closure.

5. The closure of claim 1 wherein the sensor adjustment system includes a trim piece configured to cover a portion of the opening and is pivotable with the sensor.

6. The closure of claim 1 wherein the hinge includes a closure-side bracket rotationally fixed relative to the closure, and the first end of the cable is fixed to the closure-side bracket.

7. The closure of claim 1 wherein the hinged bracket includes a securing frame against which a main body of the sensor is located and a sensor retaining mechanism configured to releasably secure the sensor to the hinged bracket.

8. The closure of claim 1 wherein the stationary bracket includes a cable housing retainer, and the cable includes a cable housing that is secured to the stationary bracket by the cable housing retainer.

9. A closure operatively engaging a vehicle, the closure comprising:
   an opening in a panel of the closure;
   a hinge about which the closure pivots; and
   a sensor adjustment system comprising:
      a stationary bracket affixed to the closure adjacent to the opening;
      a weighted hinged bracket pivotably mounted to the stationary bracket to be pivotable about a sensor pivot axis and configured to orient the weighted hinged bracket based on an orientation relative to a direction of gravity;
      a sensor mounted to the hinged bracket so as to pivot with the hinged bracket about the sensor pivot axis, the hinged bracket configured to orient the sensor to align the sensor with the opening; and
      a locking mechanism configured to selectively prevent the rotation of the weighted hinged bracket relative to the stationary bracket.

10. The closure of claim 9 wherein the hinge about which the closure pivots and the sensor pivot axis are parallel.

11. The closure of claim 9 wherein the closure is a tailgate and the sensor is a rear view camera.

12. The closure of claim 9 wherein the sensor adjustment system includes a trim piece configured to cover a portion of the opening and is pivotable with the sensor.

13. The closure of claim 9 wherein the locking mechanism is a solenoid valve that is actuatable to selectively allow and prevent the weighted hinged bracket from pivoting relative to the stationary bracket.

14. The closure of claim 9 wherein the locking mechanism comprises a weighted swing lever pivotable about an axis parallel to and spaced from the sensor pivot axis and configured to maintain an orientation relative to the direction of gravity, and wherein the weighted hinged bracket includes a gimble extension configured to selectively engage the weighted swing lever to selectively restrict pivoting of the weighted hinged bracket relative to the stationary bracket.

* * * * *